US011098583B1

(12) United States Patent
Sirevaag (10) Patent No.: US 11,098,583 B1
(45) Date of Patent: Aug. 24, 2021

(54) METHOD FOR DETERMINING THE INTEGRITY OF A SOLID BONDING BETWEEN A WELLBORE AND A CASING (71) Applicant: Equanostic AS, Oslo (NO)

(72) Inventor: Tore Sirevaag, Oslo (NO)

(73) Assignee: Equanostic AS, Oslo (NO)

( * ) Notice: Subject to any disclaimer, the term of this patent is extended or adjusted under 35 U.S.C. 154(b) by 0 days.

(21) Appl. No.: 17/159,341

(22) Filed: Jan. 27, 2021

(30) Foreign Application Priority Data

Mar. 12, 2020 (GB) ..................... 2003621

(51) Int. Cl.
E21B 49/00 (2006.01)
E21B 47/14 (2006.01)
G01V 1/50 (2006.01)

(52) U.S. Cl.
CPC ............ *E21B 49/005* (2013.01); *E21B 47/14* (2013.01); *E21B 49/003* (2013.01); *G01V 1/50* (2013.01); *G01V 2210/6242* (2013.01)

(58) Field of Classification Search
CPC ................. E21B 47/14; E21B 49/005
See application file for complete search history.

(56) References Cited

U.S. PATENT DOCUMENTS 3,401,773 A * 9/1968 Synnott, III ............ G01V 1/50
367/34
4,255,798 A * 3/1981 Havira .................... G01V 1/44
367/35
5,357,481 A * 10/1994 Lester .................... G01V 1/523
367/31
5,591,945 A * 1/1997 Kent ..................... G06F 3/0418
178/18.04
6,018,496 A * 1/2000 Stanke .................... G01V 1/50
367/35

(Continued)

FOREIGN PATENT DOCUMENTS

GB 2008756 A * 6/1979

OTHER PUBLICATIONS

He et al., "Ultrasonic leaky flexural waves in multilayered media: Cement bond detection for cased wellbores." Geophysics 79.2 (2014): A7-A11. 5 pages.

(Continued)

*Primary Examiner* — John Fitzgerald
(74) *Attorney, Agent, or Firm* — Smith Baluch LLP (57) ABSTRACT Material on a remote side of a partition separating first and second domains is evaluated by disposing at least one ultrasonic transmitter and a plurality of spaced ultrasonic receivers along a first side of the partition in the first domain. The transmitter is activated to form ultrasonic waveforms that comprise propagated quasi leaky-Lamb waves constituting extensional waves having symmetrical zero-order modes within the partition. The received ultrasonic waveforms are processed to determine the envelope of the waves propagating through the partition from a first receiver to a second receiver that is located more remote from the transmitter than the first receiver and whose separation from the first receiver is known. The integral envelope attenuation per distance of the wave propagating through the second domain over a predefined interval establishes that the second domain contains a solid when higher than a predetermined threshold.

15 Claims, 8 Drawing Sheets

(56) References Cited

U.S. PATENT DOCUMENTS

| | | | | |
|---|---|---|---|---|
| 6,483,777 | B1* | 11/2002 | Zeroug | G01N 29/265 367/35 |
| 6,681,185 | B1* | 1/2004 | Young | G01V 1/30 367/38 |
| 7,149,146 | B2* | 12/2006 | Kuijk | E21B 47/005 367/35 |
| 7,681,450 | B2* | 3/2010 | Bolshakov | E21B 47/005 73/582 |
| 7,697,375 | B2* | 4/2010 | Reiderman | B06B 1/04 367/168 |
| 7,773,454 | B2* | 8/2010 | Barolak | G01V 1/44 367/35 |
| 7,787,327 | B2* | 8/2010 | Tang | G01V 1/50 367/27 |
| 8,964,504 | B2* | 2/2015 | Chace | G01V 5/101 367/35 |
| 9,534,487 | B2 | 1/2017 | Zeroug et al. | |
| 9,664,034 | B2* | 5/2017 | Mandal | E21B 49/00 |
| 9,732,607 | B2* | 8/2017 | Zeroug | E21B 47/095 |
| 9,772,419 | B2* | 9/2017 | Haldorsen | G01V 1/48 |
| 9,784,875 | B2* | 10/2017 | Zeroug | E21B 47/005 |
| 10,138,727 | B2 | 11/2018 | Zeroug et al. | |
| 10,344,582 | B2* | 7/2019 | Merciu | E21B 33/13 |
| 10,481,289 | B2* | 11/2019 | Merciu | G01V 1/48 |
| 10,761,064 | B2* | 9/2020 | Zeroug | G01N 29/06 |
| 10,809,405 | B2* | 10/2020 | Zeroug | G01V 1/52 |
| 2004/0019428 | A1* | 1/2004 | Young | G01V 1/30 702/18 |
| 2006/0133205 | A1* | 6/2006 | Van Kuijk | E21B 47/005 367/35 |
| 2006/0198243 | A1 | 9/2006 | Tang et al. | |
| 2006/0233048 | A1* | 10/2006 | Froelich | G01V 1/50 367/35 |
| 2007/0211572 | A1* | 9/2007 | Reiderman | E21B 47/005 367/35 |
| 2009/0231954 | A1* | 9/2009 | Bolshakov | G01V 1/50 367/35 |
| 2012/0075953 | A1* | 3/2012 | Chace | E21B 47/005 367/35 |
| 2014/0056101 | A1* | 2/2014 | Vu | G01V 1/50 367/35 |
| 2014/0177389 | A1* | 6/2014 | Bolshakov | G01V 1/50 367/35 |
| 2015/0198732 | A1* | 7/2015 | Zeroug | E21B 47/005 367/35 |
| 2015/0218930 | A1 | 8/2015 | Zeroug et al. | |
| 2015/0219780 | A1* | 8/2015 | Zeroug | E21B 49/003 702/6 |
| 2015/0331134 | A1* | 11/2015 | Haldorsen | G01V 1/50 367/35 |
| 2016/0047238 | A1* | 2/2016 | Zeroug | E21B 47/005 367/86 |
| 2016/0209539 | A1 | 7/2016 | Calvez et al. | |
| 2017/0090057 | A1* | 3/2017 | Thierry | G01V 1/50 |
| 2017/0090058 | A1* | 3/2017 | Brill | G01V 1/50 |
| 2017/0139072 | A1* | 5/2017 | Kalyanraman | E21B 47/14 |
| 2017/0350231 | A1* | 12/2017 | Merciu | E21B 49/00 |
| 2018/0067223 | A1* | 3/2018 | Le Galvez | G01V 1/40 |
| 2018/0142545 | A1* | 5/2018 | Lei | G01V 1/50 |
| 2018/0149019 | A1* | 5/2018 | Bose | G01V 1/50 |
| 2018/0156759 | A1* | 6/2018 | Lei | E21B 47/14 |
| 2018/0196157 | A1* | 7/2018 | Zeroug | G01V 1/46 |
| 2018/0306751 | A1* | 10/2018 | Zeroug | G01N 29/041 |
| 2018/0328163 | A1* | 11/2018 | Hayman | G01N 29/041 |
| 2020/0049850 | A1* | 2/2020 | Liu | E21B 47/005 |
| 2020/0072040 | A1* | 3/2020 | Liu | E21B 47/047 |
| 2020/0300077 | A1* | 9/2020 | Matuszyk | G01N 29/4436 |
| 2021/0032973 | A1* | 2/2021 | Gkortsas | G01V 1/44 |
| 2021/0140302 | A1* | 5/2021 | Sirevaag | G01V 1/46 |

OTHER PUBLICATIONS

Li et al., "Natural beam focusing of non-axisymmetric guided waves in large-diameter pipes." Ultrasonics 44.1 (2006): 35-45.

Nelson, "A universal dispersion curve for flexural wave propagation in plates and bars." Journal of Sound and Vibration 18.1 (1971): 93-100.

Rose et al., "Ultrasonic Waves in Solid Media." ASAJ 107.4 (2000): 1807-1808.

Search Report and Written Opinion in United Kingdom Patent Application No. GB2003621.6 dated Jan. 6, 2021, 7 pages.

Sirevaag, Ultrasonic borehole logging: Expanding the processing of the ultrasonic measurements to improve the evaluation of logging behind the casing. PhD thesis Norwegian University of Science and Technology (NTNU) 2019. 164 pages.

U.S. Appl. No. 17/090,031, filed Nov. 5, 2020 entitled "Method for Evaluating a Material on a Remote Side of a Partition using Ultrasonic Measurements".

Van Kuijk et al., "A novel ultrasonic cased-hole imager for enhanced cement evaluation." International petroleum technology conference. International Petroleum Technology Conference, 2005. 14 pages.

Velichko et al., "Excitation and scattering of guided waves: Relationships between solutions for plates and pipes." The Journal of the Acoustical Society of America 125.6 (2009): 3623-3631.

Viggen et al., "Analysis of outer-casing echoes in simulations of ultrasonic pulse-echo through-tubing logging." Geophysics 81.6 (2016): D679-D685. 7 pages.

Viggen et al., "Simulation and modeling of ultrasonic pitch-catch through-tubing logging." Geophysics 81.4 (2016): D383-D393. 12 pages.

Zeroug et al., "Ultrasonic leaky-Lamb wave imaging through a highly contrasting layer." IEEE Symposium on Ultrasonics, 2003. vol. 1. IEEE, 2003. 5 pages.

Zeroug et al., "Ultrasonic leaky-Lamb wave imaging through a highly contrasting layer." IEEE Symposium on Ultrasonics, 2003. vol. 1. IEEE, 2003. Abstract only. 3 pages.

* cited by examiner

METHOD FOR DETERMINING THE INTEGRITY OF A SOLID BONDING BETWEEN A WELLBORE AND A CASING

CROSS-REFERENCE TO RELATED APPLICATION(S)

This application claims to priority to GB2003621.6, which was filed on Mar. 12, 2020, and is incorporated herein by reference in its entirety.

FIELD OF THE INVENTION

The present invention relates to evaluating a material on one side of a partition using ultrasonic measurements.

BACKGROUND

Deep surface wells are created by drilling a hole into the earth with a drilling rig that rotates a drill string with a bit attached. After the hole is drilled to a prescribed depth, sections of steel tubing known as casing are set in the hole. To be able to lower it down, the casing is slightly smaller than the borehole. The small space between the formation and the casing is cemented in order to prevent oil and gas migrating up to the surface. This is done by pushing the cement down to the end of casing and squeezing it from the prescribed depth and up the annulus. During the drilling, completion and permanent closure of an oil well, it is a challenge to verify if the cement has been squeezed up the annulus and bonded to outside of the casing surface. If no pressure test is planned, the primary method to validate that the annulus is impermeable, is to use ultrasonic borehole logging. To improve the identification of whether an impermeable solid is bonding onto the casing, efforts have been made to provide solutions for using ultrasonic logging in the field.

US2006198243 discloses a method and apparatus for determining the integrity of a cement bond log disposed in the annular space between a casing and a wellbore. The method and apparatus induce a Lamb wave in the casing and into the wellbore. The Lamb wave attenuates upon passage beside the cement bond. The integrity of the cement bond log can be determined by analysis and evaluation of the attenuation results.

U.S. Pat. No. 9,534,487 uses a transmitter and several receivers to measure the zero-order mode ($S_0$) symmetric extensional Lamb waveforms. These are processed to obtain the amplitude attenuation dispersion plot and phase dispersion plot as functions of frequency as means to characterize the physical state of a casing and annular fill outside the casing. The technique obtains information by transmitting a pressure wave ($T_1$) with oblique incidence at the casing wall that excites a guided wave propagating upwards in the casing. The guided wave leaks off energy as it propagates, and the leaked off pressure wavefront is measured at receivers positioned further up the well. Since Lamb waves leak energy as they propagate, the waves are constantly attenuated as the distance increases.

U.S. Pat. No. 9,534,487 also estimates the amplitude attenuation dispersion and phase dispersion of the extensional Lamb wave, where the ultrasonic waveforms are processed to obtain (i) an amplitude attenuation dispersion plot of attenuation as a function of frequency and (ii) a phase dispersion plot of phase velocity as a function of frequency. Barrier wavespeeds are determined by identifying discontinuities within the amplitude attenuation dispersion plot, which are then related to the discontinuities to barrier wavespeeds using the phase dispersion plot.

U.S. Pat. No. 10,138,727 processes the zero-order mode antisymmetric Lamb flexural waveforms to identify barrier parameters as a function of azimuth and depth along the borehole, wherein the waveforms comprise at least two of sonic signals, ultrasonic pulse-echo signals, and ultrasonic pitch-catch signals. The patent states that the preprocessing extract attributes particular to each measurement such as decay rate for the pulse echo and attenuation for the flexural and extensional modes. These attributes are then compared to a multi-dimensional library of pre-calculated attributes as a function of cement properties and bond properties. A match up to a specific criterion provides the set of inverted cement parameters. The attenuation can be estimated across two or more receivers. Two attributes can be used: the energy envelope peak decay as well as the attenuation dispersion (i.e., as a function of frequency).

US2016209539 discloses methods and systems for separating leaky-Lamb modes to evaluate cylindrically layered structures. Embodiments involve receiving acoustic cement evaluation data from one or more acoustic downhole tools used over a depth interval in a well having a casing. Embodiments also involve determining an extensional mode component and a flexural mode component of the leaky-Lamb wave measurements and determining a flexural wave attenuation based on the flexural mode component of the leaky-Lamb wave measurement.

US2015218930 discloses systems and methods for estimating an acoustic property of an annulus in a cement evaluation system.

Reference is also made to the following publications:

Xiao He et al. "*Ultrasonic leaky flexural waves in multilayered media: Cement bond detection for cased wellbores*", March 2014, Geophysics 79(2):A7-A11. This publication investigates ultrasonic leaky flexural modes in radially multilayered media through finite-difference modeling to evaluate cementing for the whole annulus of a casing.

Erlend Magnus Viggen et al., "*Simulation and modeling of ultrasonic pitch-catch through-tubing logging*," July 2016, Geophysics 81: D383-D393. This publication discloses the use of a finite-element model of a double-casing geometry with a two-receiver pitch-catch setup for logging in double-casing geometries.

SUMMARY OF THE INVENTION

In accordance with the invention there are provided methods for evaluating a material on a remote side of a partition having the features of the independent claims.

The present invention differs from known approaches in integrating the envelope of the $S_0$ mode within a predefined time window or interval in the time domain to aggregate the amount of energy, calculating the attenuation of $S_0$ mode from one receiver to the next, computing the attenuation parameter against the acoustic impedance, and converting the results to a probability estimate of the likeliness of a solid behind the partition. A further feature of the invention is that processing targets the early arrival of the $S_0$ mode where the phase and group velocity is considered more constant. In addition, the early arrival is less influenced by other Lamb modes or direct waves due to the high velocity of the $S_0$ mode for the lower frequencies. Since a more constant group velocity results in the mode being less smeared out, calculation of the integral within the predefined time interval and the computation of the attenuation, results in the method being more robust than just evaluating a peak. Since the $S_0$ mode is highly affected by the presence of a shear modulus in the material behind the partition, computing the integral attenuation makes it possible to obtain information about the shear coupling. Thus, an embodiment of the present invention estimates the probability of a solid material being present, i.e. a method for differentiating a solid material from a fluid. The invention quantifies the integral attenuation over a predefined interval as will be discussed below.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
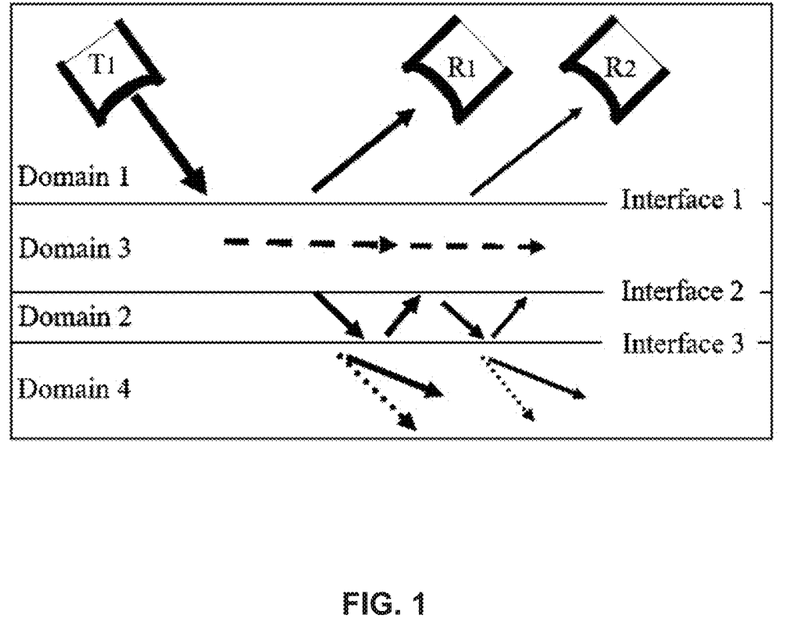
FIG. 1 shows schematically a measuring method and system for characterizing the physical state of a partition installed in a borehole.

FIG. 1 shows schematically a measuring method and system according to an embodiment of the invention for characterizing the physical state of a partition installed in a borehole. The partition is constituted by the wall of a pipe known as a "casing" that is installed in a borehole, thus separating a first domain inside the casing from a second domain outside the casing. The casing is surrounded by solid geological formation, which in the case of an oil or gas well is typically the seabed. The casing usually comprises multiple sections of progressively narrower the deeper they are inserted into the geological formation. After installation of each section of casing, it is cemented inside the borehole so as to form a secure rigid enclosure around the casing, which serves as a conduit for accommodating the drill and releasing the oil or gas through perforations made in the portion of the casing which passes through the production zone, to provide a path for the oil to flow from the surrounding rock into the production tubing. Thus, with reference to FIG. 1 it is possible to define four domains as follows:

Domain 1 is the hollow space inside the casing;

Domain 2 is the annular space between the outer wall of the casing and the formation. If there is no annular space, i.e. the formation is bonded onto the casing, Domain 2 will vanish; and Domain 3 is the wall, which constitutes a partition between the formation and the first domain. In an oil well the partition refers to a casing which is a larger pipe that is assembled and inserted into the recently drilled section of the borehole;

Domain 4 is the geological formation.

We will refer to these four domains as first, second, third and fourth domains, respectively. Further, "Interface 1" is defined between Domains 1 and 3, "Interface 2" is between Domains 2 and 3, and "Interface 3" between Domains 2 and 4, as seen in FIG. 1. At least one transmitter $T_1$ is positioned inside the casing, where the transmitted signal propagates and hits the wall of the casing at an oblique incidence. The transmitted signal excites a guided wave inside the wall of the casing formed of a known material and having a known thickness.

From theory, a transducer positioned at an angle inside a liquid-filled pipe can excite guided waves that are similar to Lamb waves. The diameter, $d_c$, and the thickness, $t_c$, of the cylindrical pipe determine the deviation between the guided waves and the Lamb waves. If the ratio is above 10, which is typically the case in the field, the difference is negligible. The similarity also depends on the frequency, but if the wavelength of the guided wave is much less than the pipe circumference and is greater than 10, the effect of the curvature becomes insignificant.

The well geometry can be understood in 2-dimensional spatial coordinates, where the length of the partition is the axial direction and the azimuthal direction is simplified as only one direction. Further, in the frequency regime of interest, the two zero-order modes dominate the propagating wave in the partition. The zero-order antisymmetric mode ($A_0$) referred to as the flexural wave, has an elliptical particle-motion mainly perpendicular to the partition, i.e. in the axial direction. This creates a 'bending' or 'flexural' motion. Thus, the particle motion in the casing is elliptical, with the vertex pointing in the direction of the surrounding material, resulting in waves being emitted from each side of the casing. Since the vortex is pointing out in the normal direction of the partition, the largest proportion of energy will be transmitted as the normal displacement vector. This makes the $A_0$ mode less dependent of the material in Domain 2, since both fluids and solids can couple waves radiating as the normal displacement vector from the partition.

The zero-order symmetric mode ($S_0$) referred to as the extensional wave, has an elliptical particle displacement that is mainly parallel to the partition, i.e. in the axial direction, which results in the vertex pointing in the direction of the propagating wave. Consequently, the largest proportion of energy will be transmitted as the tangential displacement vector. Therefore, if the material behind the partition consists of a material without shear modulus, only a small fraction of energy will leak off from the steel plate constituting Domain 3 into Domain 2. If there is a shear coupling at Interface 2, sufficiently more energy will radiate into Domain 2, i.e. if a solid material is bonding to the casing.

Figure 2A:
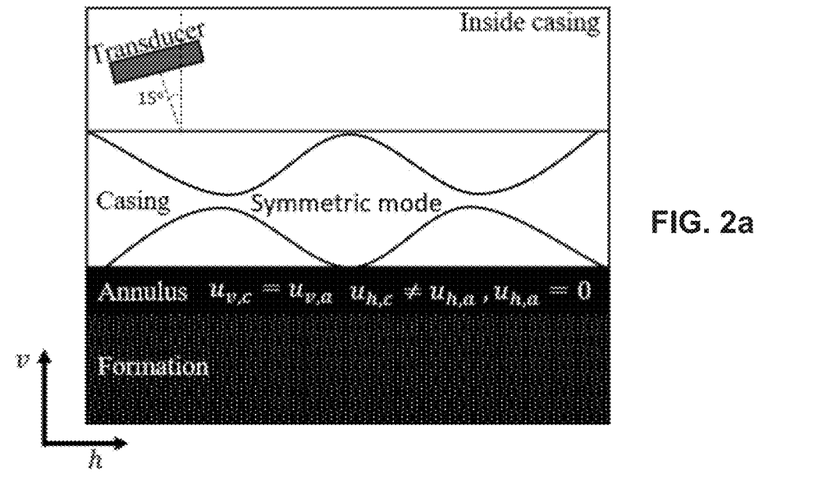
FIGS. 2a and 2b shows schematically the orientation of the transducer with respect to the partition without and with shear coupling respectively.
Figure 2B:
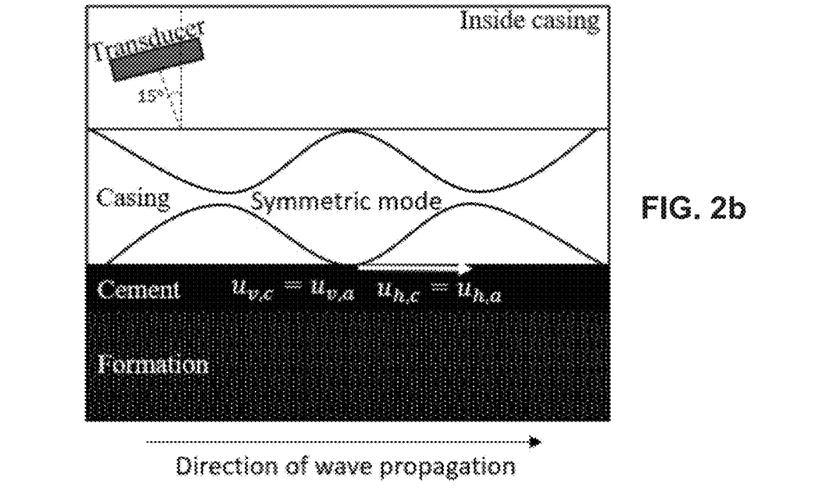

The excitation of $S_0$ at the pipe/plate requires an oblique incidence angle around 15° if Domain 1 is filled with water and Domain 3 is made of steel. This is illustrated in FIG. 2, where FIG. 2a relates to a fluid in Domain 2 and FIG. 2b relates to a cement in Domain 2.

Figure 3A:
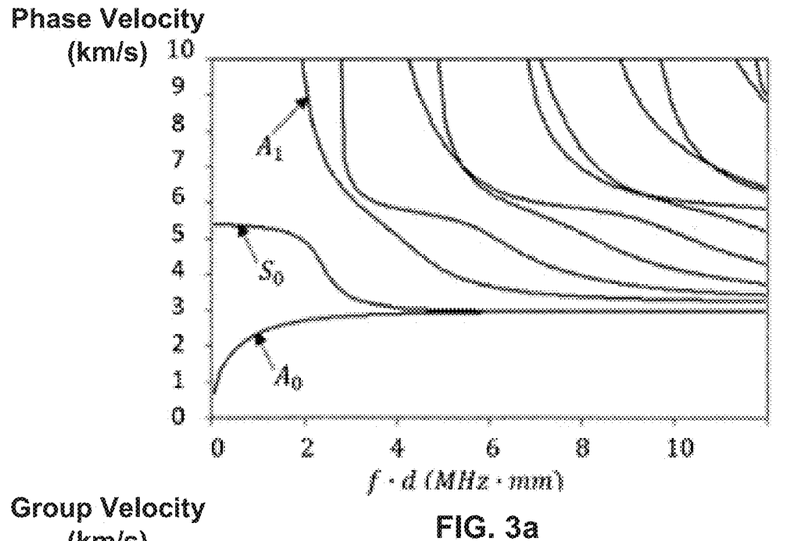
FIGS. 3a and 3b shows the phase and group velocity of Lamb modes excited in a steel plate in vacuum.
Figure 3B:
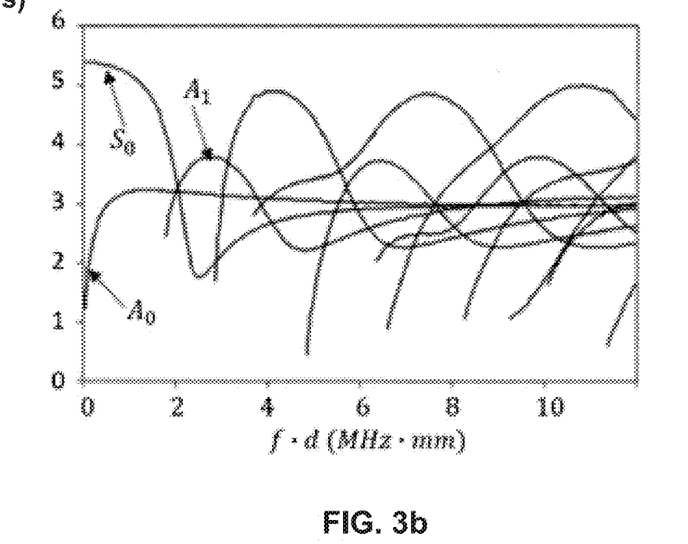

Countless different Lamb modes can be excited inside a partition depending on the transducer frequency, partition thickness and the incidence angle. FIG. 3 show the phase and group velocity of some of the low Lamb modes, including $A_0$ and $S_0$. The horizontal axis is the frequency (f) multiplied by the casing thickness (d), which makes it convenient to compare different dimensions if the ratio f·d remains constant. The figure demonstrates that $S_0$ is highly dispersive, however, at the earlier frequencies the group velocity is considered more constant.

The system also requires at least two receivers, as seen in FIG. 1, as $R_1$ and $R_2$, both of which are located in Domain 1 and oriented in mirror symmetry to the transducer relative to a line normal to the outer surface of the casing at an angle of reflection that is equal to the incidence angle of the transducer. The extensional wave leaks off energy as it propagates, and the leaked off pressure wavefront is measured at receivers positioned further up the well. Since the extensional wave leaks energy as it propagates, the wave is being constantly attenuated as the distance increases. The materials on both sides of the casing i.e. in Domains 1 and 2 affect the attenuation. Assuming the material inside Domain 1 is known, measuring the attenuation from one receiver to the next provides information about the acoustic properties of the material constituting the annular space (Domain 2).

Figure 4:
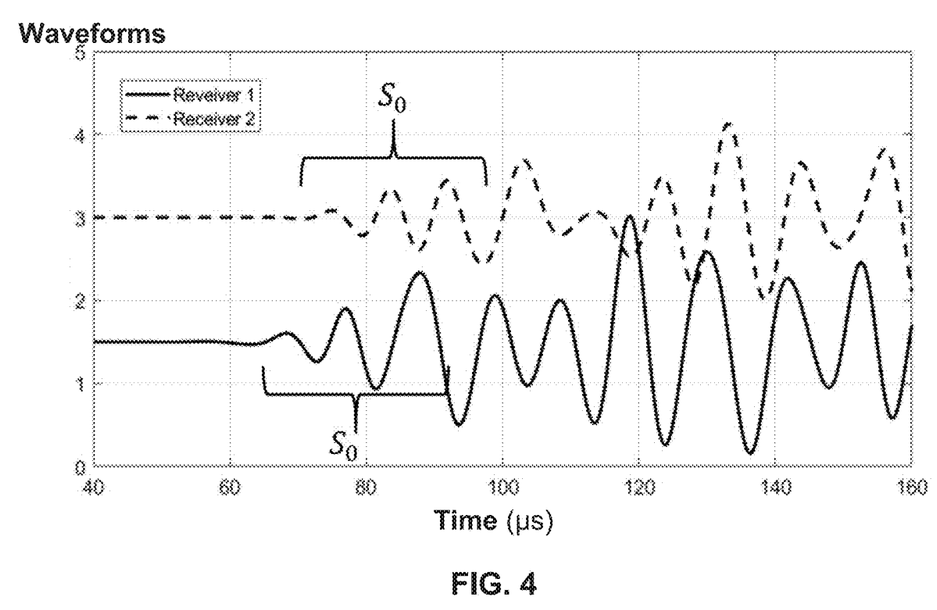
FIG. 4 is a graphical representation showing numerical waveforms similar as expected from extensional logging in the field.

FIG. 4 shows numerical waveforms similar as expected from extensional logging in the field and illustrates the dispersion smearing out the pulse, where the first waveform is from $R_1$ and the second waveform is from $R_2$, as shown in FIG. 1. The first pulse is the arrival of the emitted wavefront from the extensional wave ($S_0$), but as seen in FIG. 3, the group velocity is highly dispersive, which results in the pulse being smeared out. The brace above the pulse in FIG. 4 indicates the range of interest of the $S_0$ mode, and within this range it can be seen that the pulse is preserved due to approximately constant group velocity in that frequency range (as seen in FIG. 3 at the low frequencies). The rest of the waveform is a combination of the $S_0$ mode, the $A_0$ mode, and the fluid borne wave (direct wave), and this region is not qualified for evaluating the attenuation of the envelope. The region where the $S_0$ mode is being evaluated has only traveled in domains 1 and 3, but the attenuation within this region is highly affected by whether the material in Domain 2 consists of a solid. As the extensional wave propagates along the casing, waves are constantly being leaked off. However, in the absence of a shear coupling at interface 2, the attenuation is significantly reduced. A shear modulus in Domain 2 allows coupling of the $S_0$ mode and the waves leaking off in both the normal direction and the tangential direction, as illustrated in FIG. 2b by the arrow in the cement layer.

Figure 5A:
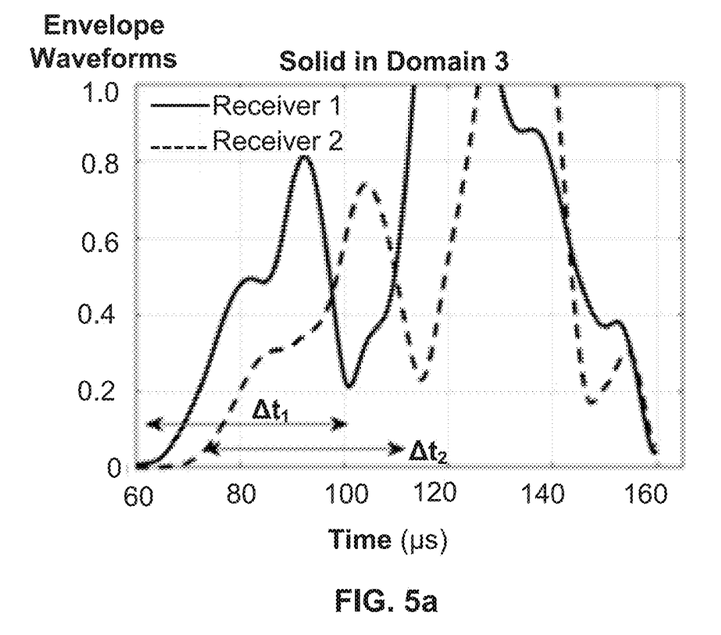
FIGS. 5a and 5b are graphical representations showing the envelope of the extensional pulse when the annulus is filled with a liquid or solid, respectively.
Figure 5B:
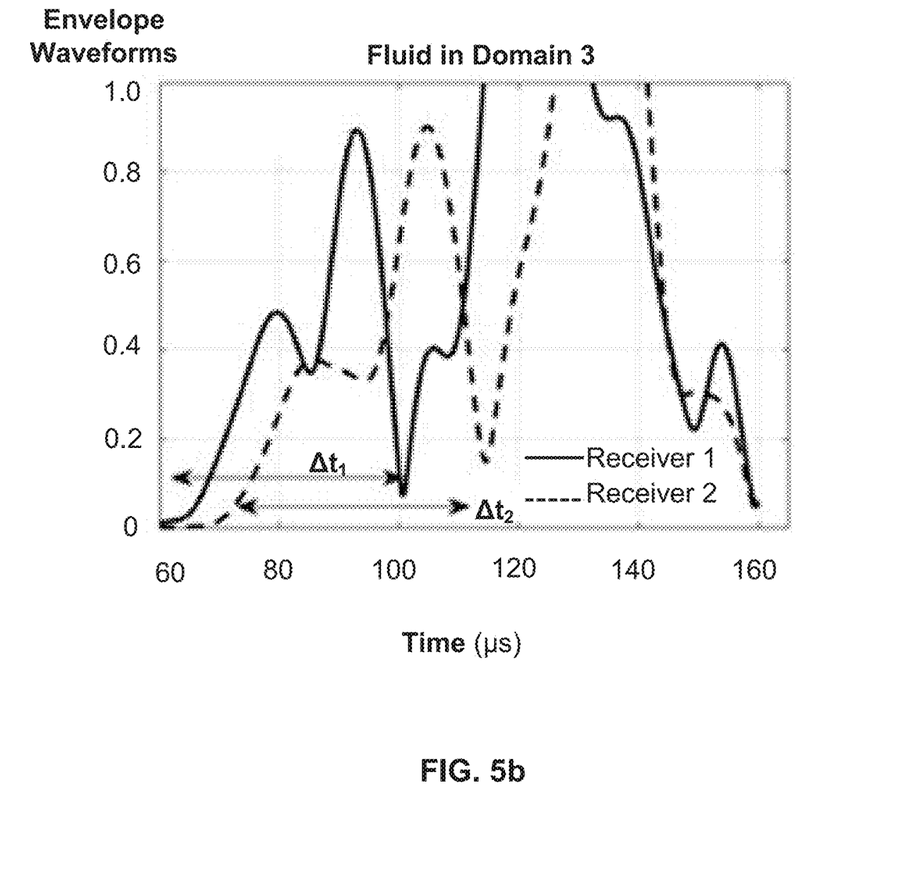

The outcome is demonstrated in FIG. 5, where FIG. 5a has a fluid in Domain 2 while FIG. 5b has a solid. FIG. 5 shows the envelope of the waveforms and the time axis is minimized to demonstrate the attenuation of the early $S_0$ mode. The waveforms in FIG. 5a are the same as in FIG. 4, and the envelopes in FIG. 5b are also from a numerical simulation using cement acoustic properties. The double-ended arrows defining $\Delta t_n$, where n=1, 2, show the predefined time intervals that are analyzed, and from the figure one can see that the attenuation is significantly stronger when Domain 2 consists of a solid material. The integral can be estimated by the equation below, where $S_{e,n}$ is the envelope of the waveform and defines the closed interval where n=1, 2 and specifies which waveform:

$$E_{amp,n} = \int_{t_{n,1}}^{t_{n,2}} S_{e,n}(t)dt \quad (1)$$

The amplitude of the extensional wave decreases exponentially as it propagates along the casing if the group velocity is constant. Further, since the amplitude of the leaked off pressure wavefront is related to the amplitude of the extensional wave, the leaked off wavefront will also decrease exponentially. Hence, the attenuation can be found by measuring the peak amplitude at two different distances and divide the peak measured at the further distance by the peak measured at the nearest distance, as illustrated by the receivers in FIG. 1. However, the $S_0$ mode presented in FIG. 3 shows that the group velocity is constant only within a small frequency range, so a better technique is to calculate the integral within a predefined time window, as seen in the Eq. (1) and estimate the attenuation. The integral attenuation ($\alpha_{dB}$) in decibel (dB) is then found as given below:

$$\alpha_{dB} = 20\log_{10}\left(\frac{E_{amp,2}}{E_{amp,1}}\right) \quad (2)$$

Where equation (2) can be then used to estimate the loss in energy within a predefined time-window between the two waveforms.

Figure 6A:
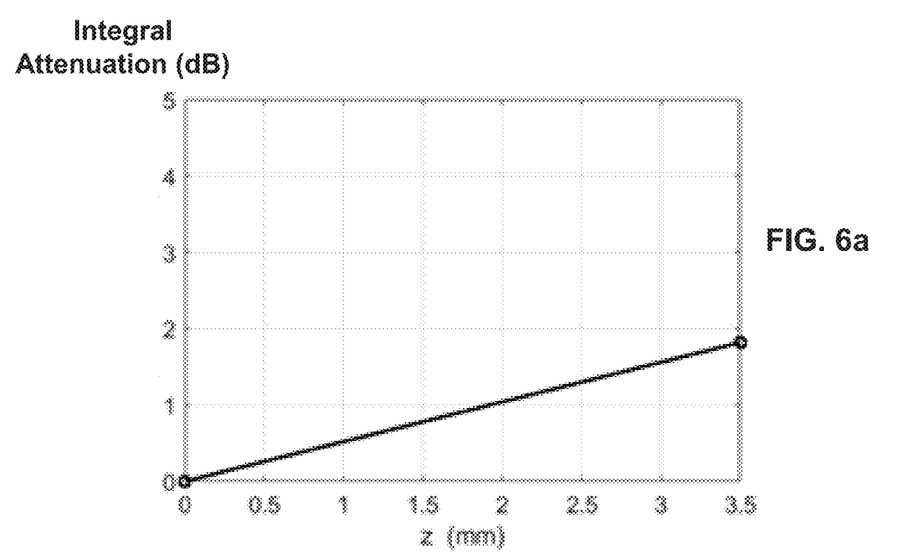
FIGS. 6a and 6b are graphical representations showing the attenuation of the extensional mode according to the invention.
Figure 6B:
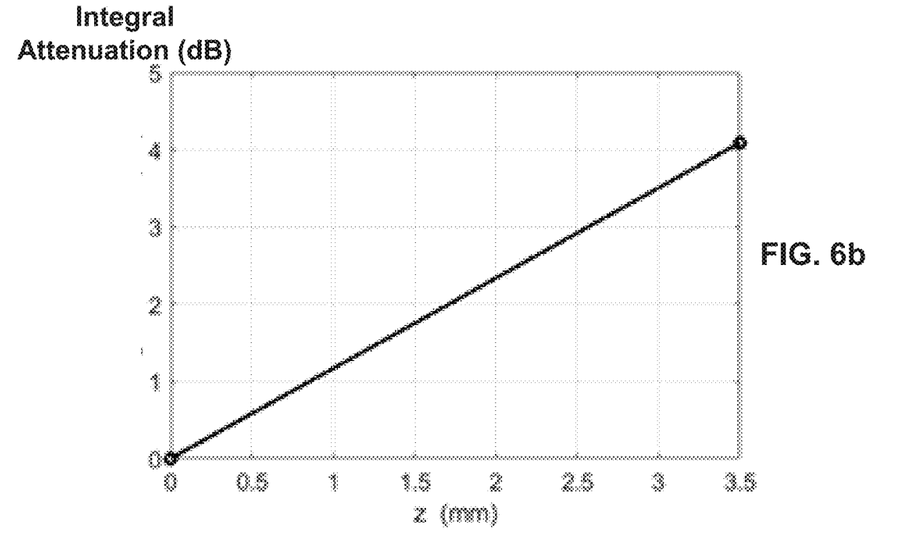

FIG. 6 shows integral attenuation, estimated by using Eq. (2), plotted as a logarithmic function, where FIG. 6a is the attenuation from the envelopes seen in FIG. 5a, and FIG. 6b is the attenuation from the envelopes seen in FIG. 5b. The horizontal axis represents the distance the $S_0$ mode has propagated inside Domain 3. From the figure one can see that the attenuation is significantly higher (more than twice) when Domain 2 consists of a solid.

Figure 7:
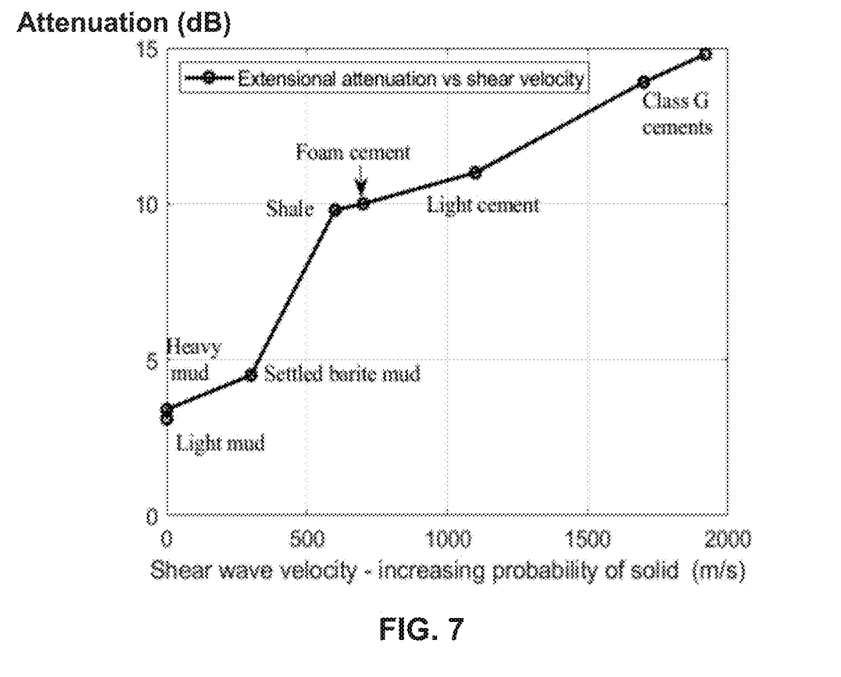
FIG. 7 is a graphical representation showing the attenuation vs the acoustic impedance for different materials in the annulus estimated according the invention.

The attenuation presented in FIG. 6 can be quantified by dividing it by the distance propagated to estimate attenuation per centimeter (cm):

$$\alpha_{z,dB} = \frac{\alpha_{dB}}{z_2 - z_1} \quad (3)$$

where $z_n$ is the distance propagated inside Domain 3, and n=1, 2 represents the index for $R_1$ and $R_2$. $\alpha_{z,dB}$ is the attenuation expressed in dB/cm, which is plotted in FIG. 7. Specifically, the function in FIG. 7 shows $\alpha_{z,dB}$ plotted against the acoustic impedance for various different solids and fluids in Domain 2. The data seen in the figure were obtained from a study using numerical simulations, where the acoustical properties of the materials are presented in Table 1 below.

TABLE 1

| Material | ρ (kg/m³) | $v_p$ (m/s) | Z (MRayl) | $v_s$ (m/s) |
| --- | --- | --- | --- | --- |
| Light mud | 1115 | 1670 | 1.68 | |
| Heavy mud | 1260 | 1950 | 1.8 | |
| Foam cement | 1114 | 2203 | 2.41 | 700 |
| Settled barite mud | 2052 | 1340 | 2.75 | 300 |
| Light cement | 1200 | 2600 | 3.12 | 1000 |
| Shale | 2500 | 2000 | 5.0 | 720 |
| Class G cement 1 | 1820 | 4241 | 5.9 | 1700 |
| Class G cement 2 | 1980 | 3350 | 6.63 | 1920 |

Some materials are real values from the inventor's doctoral thesis, Sirevaag, T. PhD thesis *A Study of the Ultrasonic Measurements for Logging Behind a Steel Pipe: Expanding the processing to improve the differentiation between heavy fluids and light solids*, Norwegian University of Science and Technology (NTNU), which is incorporated herein by reference. It is noted that the method according to the present invention has no connection to the work in the doctoral thesis: only the material properties are used to create realistic simulations. In FIG. 7 it is seen that solids have a significantly higher attenuation, despite having the same acoustic impedance (see foam cement and settled barite mud). Therefore, if the attenuation is greater than a predetermined threshold e.g., this is indicative of the material being a solid. When analyzing the material behind a partition, all attenuation measurements within the inspection run are used to create a model, and the minimum and maximum attenuation are used to define the outer boundaries. The threshold is set between the outer boundaries, and the value may vary from each inspection run.

Figure 8:
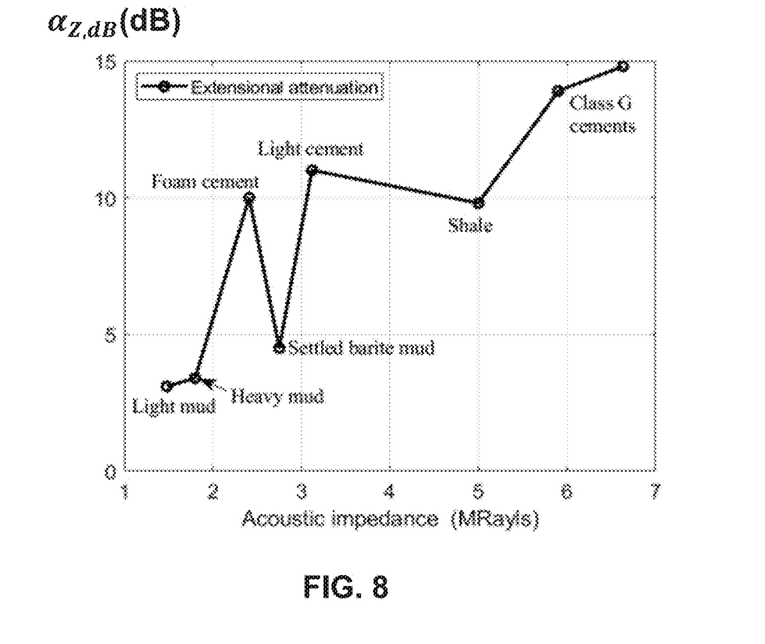
FIG. 8 is a generic plot showing the principal analysis method according to the invention.

Alternatively, the invention provides a complementary method of evaluating $\alpha_{z,dB}$. Instead of plotting $\alpha_{z,dB}$ against the acoustic impedance, one can plot it against the shear wave velocity. This is seen in FIG. 8, where $\alpha_{z,dB}$ increases with increasing shear wave velocity. From this, one can make a probability estimate of the likeliness of a solid in Domain 2. A higher attenuation then equals a higher probability of a solid.

Figure 9:
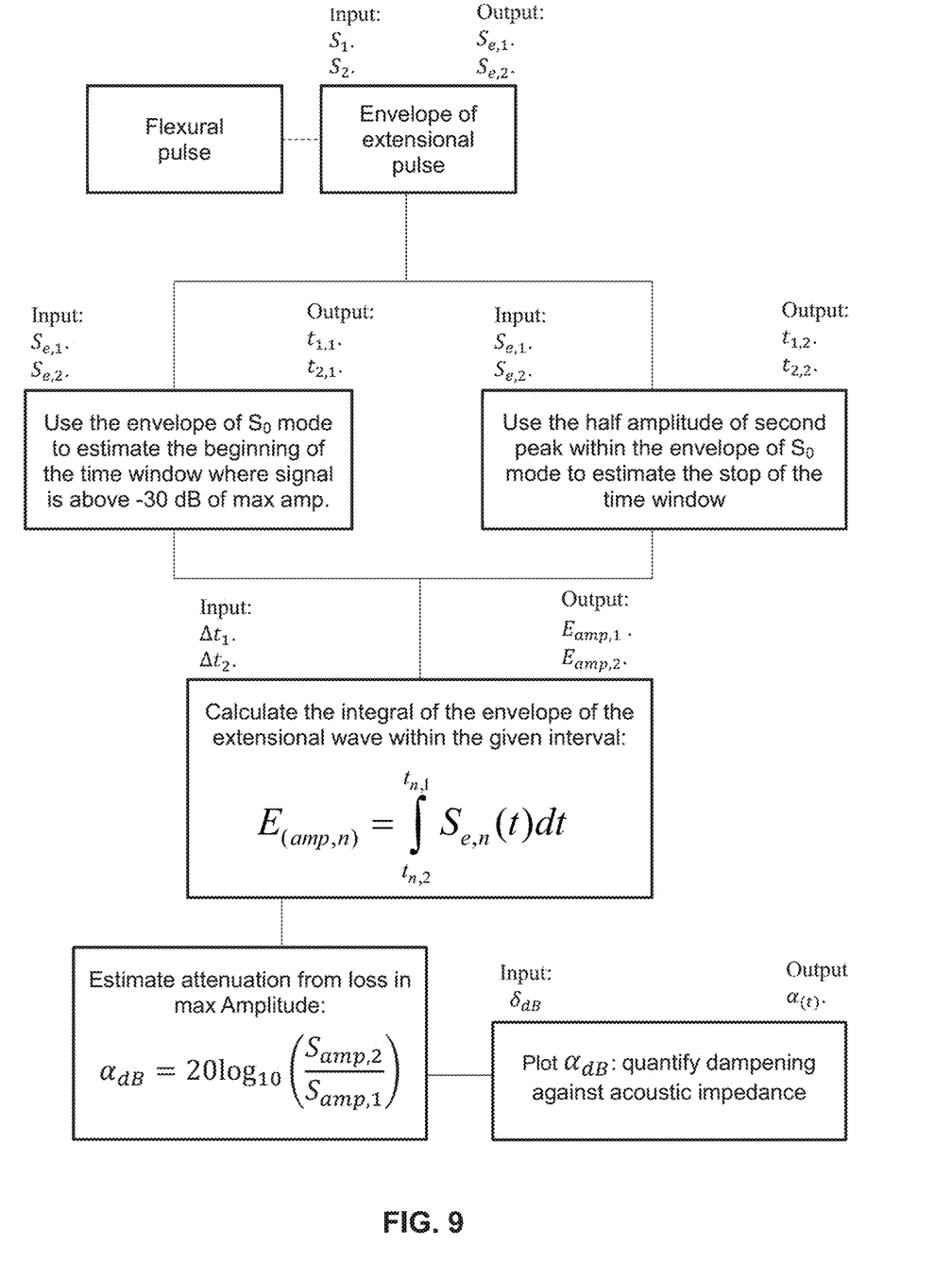
FIG. 9 is a generic flowchart showing the principal analysis method according to the invention.

FIG. 9 shows a generic flowchart to describe the processing to estimate $\alpha_{z,dB}$ between the extensional waves excited in the casing. The flowchart starts with the input of the extensional wave and knowledge of the distance between the receivers. The final output is parameter to quantify the peak envelope attenuation.

FIG. 9 shows how to pick the beginning and end time of the time window, $t_1$ and $t_2$, based on the amplitude within the envelope of the $S_0$ mode. The start time, $t_1$ is defined as where the signal is first above the signal noise level, which in some embodiments of the invention is defined as −30 dB of the maximum amplitude within the normalized envelope of the whole waveform, although other noise thresholds may be employed. Normalizing the envelope means that the maximum amplitude is always at 0 dB. The time window needs to end before the arrival of $A_0$ mode and/or the direct wave, so it does not influence the integral. Typically, $t_2$ is calculated from the second peak in the envelope as seen in FIG. 5, where the method estimates where the amplitude drops below the half maximum of the second peak.

It should be noted that modifications may be made to both the method and system as described without departing from the scope of the invention as claimed in the appended claims. In particular, it is noted that while the invention has been described with particular reference to evaluating a material on the outside of a pipe or casing buried in the ground, the invention may find more general application for discriminating between two different materials on opposite sides of a partition. This may be useful for evaluating whether liquid is present in a pipe used to transport liquid, thus allowing a blockage in the pipe to be detected. More generally, the partition does not need to be constituted by the wall of a cylindrical casing or pipe and can be any sheet material having disparate materials on opposing surfaces thereof.

The invention has been described primarily with regard to a method because the hardware is known per se. When used to monitor oil wells, the transmitter and receivers must be inserted into a hollow casing sunk in the ground that is possibly hundreds of meters deep. Since the distances between adjacent receivers must be known, the transducers are installed into an elongated unit that is then lowered into the casing. This also allows the transducers to be tilted at known angles of incidence and reflection although more advanced transducers are available where the wave angle can be adjusted electronically. However, when applied to other situations where the transducers are more accessible, they may be spaced apart discretely at known intervals.

It should also be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

It will also be understood that the processing may be performed by a suitably programmed computer. Likewise, the invention contemplates a computer program being readable by a computer for executing the method of the invention. The invention further contemplates a machine-readable memory tangibly embodying a program of instructions executable by the machine for performing the method of the invention.

Without derogating from the above generalizations, the inventive concepts encompassed by the invention include the following:

Inventive concept 1: A method for evaluating a material on a remote side of a partition separating a first domain from a second domain, the method comprising:

disposing at least one ultrasonic transmitter and a plurality of ultrasonic receivers in longitudinally spaced-apart relationship along a first side of the partition in the first domain;

activating the at least one ultrasonic transmitter to form ultrasonic waveforms that comprise propagated quasi leaky-Lamb waves constituting extensional waves having symmetrical zero-order ($S_0$) modes within the partition, wherein the spaced-apart receivers record the ultrasonic waveforms;

processing the recorded ultrasonic waveforms to determine the envelope of the waves propagating through the partition from a first receiver to a second receiver that is located more remote from the transmitter than the first receiver and whose separation from the first receiver is known;

integrating the envelope signal over a predefined interval;

computing an integral envelope attenuation per distance of the wave propagating through the second domain; and establishing that the second domain contains a solid if the measured integral envelope attenuation per distance is higher than a predetermined threshold.

Inventive concept 2: The method according to inventive concept 1, wherein establishing that the second domain contains a solid comprises:

processing the ultrasonic waveforms to obtain the integral envelope attenuation;

computing from the envelope a time interval within which to calculate the integral attenuation as a function of time;

creating a model with all attenuation measurements within a complete inspection run and defining a minimum and maximum attenuation as the boundaries; and comparing the attenuations and setting an attenuation threshold to determine if the space contains a liquid or a solid.

Inventive concept 3: The method of inventive concept 2, wherein computing the time interval includes (i) defining a start time $t_1$ as where the signal is first above a signal noise level; (ii) obtaining a second peak amplitude within the envelope (iii) defining an end time $t_2$ as where the signal drops below half the second peak amplitude; (iv) and using the interval between $t_1$ and $t_2$ as boundaries for the integration of the envelope.

Inventive concept 4: The method of inventive concept 3, wherein the integral of the envelope is calculated according to:

$$E_{amp,n} = \int_{t_{n,1}}^{t_{n,2}} S_{e,n}(t)dt$$

where $S_{e,n}$ is the envelope of the waveform and $[t_{n,1}t_{n,1}]$ defines a closed interval where n=1, 2 and specifies which waveform.

Inventive concept 5: The method of inventive concept 4, wherein computing the integral attenuation includes dividing the integral estimated within predefined time window of the envelope of the measured at the receiver furthest by the integral estimated within predefined time window of the envelope of the measured at the nearest receiver.

Inventive concept 6: The method according to inventive concept 5, wherein the integral envelope attenuation per distance ($\alpha_{z,dB}$) is calculated according to:

$$\alpha_{z,dB} = \frac{20\log_{10}\left(\frac{E_{amp,n}}{E_{amp,1}}\right)}{z_2 - z_1}$$

where:

($E_{amp,n}$) is the integral of the envelope of the extensional pulse at the $n^{th}$ receiver;

($P_{m,1}$) is the integral of the envelope of the extensional pulse at the first receiver;

$Z_n-Z_1$ the distance between the receivers.

Inventive concept 7: The method according to inventive concept 3, wherein the integral of the envelope amplitude is estimated from a portion of the time domain wherein the symmetric zero-order wavefront ($S_0$) arrives before a higher energy antisymmetric wavefront ($A_0$) is able to reach said portion thereby eliminating the effect of interference between the symmetric and the antisymmetric wavefronts.

Inventive concept 8: The method according to any one of inventive concepts 3 to 7, wherein the predetermined noise threshold is −30 dB of the peak amplitude within the normalized envelope of the whole waveform.

Inventive concept 9: The method according to any one of inventive concepts 2 to 8, further including computing the integral envelope attenuation per distance ($\alpha_{z,dB}$) against a probability chart to determine the likelihood of the second domain containing a solid.

Inventive concept 10: The method according to claim 9, wherein if the attenuation is greater than a predetermined threshold, this is indicative of the material being a solid.

Inventive concept 11: The method according to inventive concept 1, wherein establishing that the second domain contains a solid comprises:

identifying $E_{amp,1}$ and $E_{amp,2}$ in the measured envelope waveforms, where ($E_{amp,n}$) is the integral of the envelope of the extensional pulse at the $n^{th}$ receiver;

determining the integral attenuation;

calculating the integral envelope attenuation per distance; and comparing the integral envelope attenuation per distance to a predetermined attenuation threshold to determine if the space contains a liquid or a solid.

Inventive concept 12: The method according to inventive concept 11, wherein the predetermined attenuation threshold is in the order of 7 dB/cm.

Inventive concept 13: The method according to any one of the preceding inventive concepts, wherein the partition comprises a casing and an annular fill installed in a borehole traversing a formation.

Inventive concept 14: The method according to any one of the preceding inventive concepts, wherein each transmitter and receiver is directed toward the partition at an angle of incidence close to 15°.

Inventive concept 15: A computer program product comprising a computer readable medium storing program code instructions, which when executed on at least one processor that receives as input data representative of the recorded ultrasonic waveforms from a pair of spaced apart receivers, carries out the processing and computing operations of any one of the preceding inventive concepts.

The invention claimed is:

1. A method for evaluating a material between a wellbore and a casing, said casing having a wall forming a partition that separates a first domain inside the casing from a second domain outside the casing, the method comprising:

disposing at least one ultrasonic transmitter and a plurality of ultrasonic receivers in longitudinally spaced-apart relationship along a first side of the partition in the first domain;

activating the at least one ultrasonic transmitter to form ultrasonic waveforms that comprise propagated quasi leaky-Lamb waves constituting extensional waves having symmetrical zero-order ($S_0$) modes within the partition, wherein the spaced-apart receivers record the ultrasonic waveforms;

processing the recorded ultrasonic waveforms to determine an envelope of the waves propagating through the partition from a first receiver to a second receiver that is located more remote from the transmitter than the first receiver and whose separation from the first receiver is known;

integrating the envelope signal over a predefined interval;

computing an integral envelope attenuation per distance of the wave propagating through the second domain; and establishing that the second domain contains a solid if the measured integral envelope attenuation per distance is higher than a predetermined threshold.

2. The method according to claim 1, wherein establishing that the second domain contains a solid comprises:

processing the ultrasonic waveforms to obtain the integral envelope attenuation; and computing the integral envelope attenuation per distance ($\alpha_{z,dB}$) against a probability chart to determine the likelihood of the second domain containing a solid.

3. The method according to claim 1, wherein the partition comprises a casing and an annular fill installed in a borehole traversing a formation.

4. The method according to claim 1, wherein each transmitter and receiver is directed toward the partition at an angle of incidence equal to 15°.

5. A non-transitory computer program product comprising a computer readable medium storing program code instructions, which when executed on at least one processor that receives as input data representative of the recorded ultrasonic waveforms from a pair of spaced apart receivers, carries out the processing and computing operations of claim 1.

6. The method according to claim 1, wherein establishing that the second domain contains a solid comprises:

identifying $E_{amp,1}$ and $E_{amp,2}$ in the measured envelope waveforms, where ($E_{amp,n}$) is the integral of the envelope of the extensional pulse at the $n^{th}$ receiver;

determining the integral attenuation;

calculating the integral envelope attenuation per distance; and comparing the integral envelope attenuation per distance to a predetermined attenuation threshold to determine if the space contains a liquid or a solid.

7. The method according to claim 6, wherein the predetermined attenuation threshold is in the order of 7 dB/cm.

8. The method according to claim 1, wherein establishing that the second domain contains a solid comprises:

processing the ultrasonic waveforms to obtain the integral envelope attenuation;

computing from the envelope a time interval within which to calculate the integral attenuation as a function of time;

from all attenuation measurements within a complete inspection run, defining a minimum and maximum attenuation as the boundaries; and comparing the attenuations and setting an attenuation threshold to determine if the space contains a liquid or a solid.

9. The method according to claim 8, wherein if the attenuation is greater than said attenuation threshold, this is indicative of the material being a solid.

10. The method of claim 8, wherein computing the time interval includes (i) defining a start time $t_1$ as where the signal is first above a signal noise level; (ii) obtaining a second peak amplitude within the envelope (iii) defining an end time $t_2$ as where the signal drops below half the second peak amplitude; (iv) and using the interval between $t_1$ and $t_2$ as boundaries for the integration of the envelope.

11. The method according to claim 10, wherein the integral of the envelope amplitude is estimated from a portion of the time domain wherein the symmetric zero-order wavefront ($S_0$) arrives before a higher energy antisymmetric wavefront ($A_0$) is able to reach said portion thereby eliminating the effect of interference between the symmetric and the antisymmetric wavefronts.

12. The method according to claim 10, wherein the predetermined noise threshold is −30 dB of the peak amplitude within the normalized envelope of the whole waveform.

13. The method of claim 10, wherein the integral of the envelope is calculated according to:

$$E_{amp,n} = \int_{t_{n,1}}^{t_{n,2}} S_{e,n}(t)dt$$

where $S_{e,n}$ is the envelope of the waveform and $[t_{n,1} t_{n,1}]$ defines a closed interval where n=1, 2 and specifies which waveform.

14. The method of claim 13, wherein computing the integral attenuation includes dividing the integral estimated within predefined time window of the envelope of the measured at the receiver furthest by the integral estimated within predefined time window of the envelope of the measured at the nearest receiver.

15. The method according to claim 14, wherein the integral envelope attenuation per distance ($\alpha_{z,dB}$) is calculated according to:

$$\alpha_{z,dB} = \frac{20\log_{10}\left(\frac{E_{amp,n}}{E_{amp,1}}\right)}{z_2 - z_1}$$

where:

($E_{amp,n}$) is the integral of the envelope of the extensional pulse at the $n^{th}$ receiver;

($P_{m,1}$) is the integral of the envelope of the extensional pulse at the first receiver;

$Z_n - Z_1$ the distance between the receivers.

* * * * *